2,772,201

RECOVERING DIPHTHERIA AND TETANUS TOXOIDS

Howard Tint, Philadelphia, Pa., assignor to American Home Products Corporation, New York, N. Y., a corporation of Delaware No Drawing. Application February 18, 1953,
Serial No. 337,687

6 Claims. (Cl. 167—78)

This invention relates to a method for the fractionation and concentration of proteins of bacterial origin and to the preparation of novel protein products therefrom.

More particularly it relates to isolating in purified and concentrated form the metaphosphate complexes of desirable bacterial proteins from the broth cultures in which said proteins are produced.

The method has its principal application to the conditions under which the proteins are usually produced in the laboratory or in industry, where the desirable active protein products usually occur in a state of extreme dilution and admixed with almost overwhelming amounts of unwanted and otherwise undesirable contaminating materials, as for instance, in the typical broth cultures of the bacteria which produce the desirable protein products. Said broth cultures frequently contain undesirable proteins, sub-proteins, neutral salts, etc. from which the desired material must be separated before it can be used.

The method involves essentially the preparation of polymeric metaphosphate complexes of the bacterial proteins in the broth and the selective precipitation of successive fractions of said complexes by careful adjustment of the conditions of the broth. In all its variations it is applicable to the fractionation and concentration of such desirable bacterial products as toxoids such as those of diphtheria, tetanus, scarlet fever, botulinus, etc.; and of toxins such as those of diphtheria, tetanus, scarlet fever, staphylococcus, streptococcus, pertussis, etc.

More particularly the method of this invention has been found very useful in the preparation of concentrations of the highly antigenically active toxoids of diphtheria and tetanus.

In the past, a great variety of methods have been used in the purification and concentration of bacterial antigens. However, none of these methods was completely satisfactory in providing a simple easily reproducible procedure that would consistently produce a concentrated undenatured product in high yields. For example, listed below are some of the earlier methods with some of their disadvantages.

Salting out procedures have not resulted in clear-cut separations of inert contaminants nor have the yields of overall activity been high.

Heavy metal precipitation and selective adsorption procedures have also resulted in low yields.

Acid precipitations have largely been unsuccessful since yields have frequently been dependent upon some degree of denaturation of active fractions and the results have been poor and non-reproducible. In the case of acid protein precipitants such as trichloracetic or sulfosalicylic acids, the increased $K_f$ and instability of the product have indicated the method to be somewhat too drastic for practical purposes.

Solvent precipitation under rigorously controlled conditions of low temperature, ionic strength and solvent and protein concentrations has never been considered economically feasible because of the cost of specialized equipment, high time and labor costs and occasional losses in yield.

In contrast to the above procedures, the simple method of the instant invention results in reproducibly high yields of a product of consistently high activity with a low $K_f$, suggesting that the metaphosphate complex is extremely stable against denaturation by acids. Furthermore, the novel polymeric metaphosphate protein complex is stable and directly useful as an antigenic material which meets with all the requirements for human use of the National Institutes of Health.

The process of the invention is also advantageous in that complexing the active protein with polymeric metaphosphate ions prevents interaction of different protein molecules and enables the precipitation and separation of a single desirable protein instead of a mixture of them.

In general, the method of the invention is as follows:

To the original solution containing the desired material in the presence of accompanying macro-molecules and electrolytes as, for example, a clarified broth at a pH slightly more alkaline than the iso-electric pH of the most alkaline protein in the mixture, generally in about the pH range of 6–9, is added a solution of a soluble polymeric metaphosphate, of which ammonium, potassium and sodium hexametaphosphates are typical, dissolved in a minimal amount of water. The terms metaphosphate and hexametaphosphate are commonly used and are intended herein to refer to soluble vitreous alkali metal phosphates consisting of materials having an $M_2O/P_2O_5$ mole ratio lying between 1.0 and 1.66, where "M" signifies an alkali metal, and these phosphates are hereinafter referred to simply as "polymeric metaphosphates." (See Von Wazer, Ind. Eng. Chem. 41, 189 (1949); Von Wazer, J. A. C. S. 72, 647 (1950); and Partridge, Chem. & Eng. News 27, 214 (1949).)

The polymeric metaphosphate is added in an amount in excess of one metaphosphate polymer per protein amino group. This amount may be determined empirically or calculated from titration procedures. But since the final concentration of polymeric metaphosphate ions must be sufficient to overcome a tendency for reversal of precipitation of the complex by neutral salts in the broth, it is preferable to determine the amount empirically for each specific broth by ascertaining the amount of polymeric metaphosphate required to precipitate all of the metaphosphate precipitatable proteins from an aliquot portion of the original broth. At this state of the procedure we have a solution containing a mixture of relatively highly undissociated protein polymeric metaphosphate complex molecules, other broth macro-molecules and neutral salts.

At this point it is desired to separate all of the particular active protein from the broth solution in concentrated form. It has been found in general that by reducing the pH of the broth to a point below the iso-electric pH of any particular protein metaphosphate complex, said complex is rendered insoluble. By adjusting the pH of the broth to a point below the iso-electric pH of the particular active protein sought, it will precipitate together with all other protein complexes having higher iso-electric pH's. Therefore, by taking advantage of variations of this principle, the desired protein complex can be separated from the broth in concentrated form and fractionated from other broth proteins.

This may be accomplished by precipitating all of the protein complex molecules having an iso-electric pH equal to or higher than that of the active protein, separating them from the solution and then fractionating them to further purify the active protein complex; or alternatively by fractionally precipitating the protein complexes one by one directly from the broth. However, since we are here dealing with a large volume of broth containing many impurities, for ease of handling it is preferred to precipitate and separate from solution in one step the active protein complex together with all protein complexes having a higher iso-electric pH and then fractionate that mixture.

The complete precipitation is accomplished by adjusting the pH of the cold solution to a pH sufficiently acid to precipitate all of the activity of the broth. This pH can be predetermined empirically on an aliquot portion of the original broth coincidentally with the determination of the amount of polymeric metaphosphate required. The desired pH will be to the acid side of the iso-electric pH of the particular active protein metaphosphate complex. Since the metaphosphate protein complex is much more stable against denaturation than the original active protein material, a pH slightly lower than actually required for complete precipitation of all the activity will not be particularly harmful. However, it is preferable not to go below a pH of about 2.5 and in the case of diphtheria and tetanus toxoids, the operable range would be a pH of about 2 to 4 with a pH of 3 preferred.

The precipitation can take place at any usual working temperature; however, in working with labile materials, in order to prevent denaturation, it is generally preferable to work at as a low temperature as possible. The preferred operating range is from about 0–5° C.

The acid used for pH adjustment must be a strong acid; and since the final product is to be used parenterally, it is desirable to use an acid of which the anion will form an innocuous material on neutralization. It is preferred therefore to use hydrochloric acid for all acidification although others such as phosphoric acid could be used.

The precipitate can now be filtered from the solution with the use of a filter-aid and washed with cold saline solution or with a non-toxic buffer at the pH of the precipitation.

The desired activity is now to be found in the precipitate in a concentrated form and purified to the extent of separation from those materials left in the filtrate. It is conceivable, however, that in some isolated cases, the desired activity will be found in the solution and the metaphosphate precipitation will have resulted only in the removal of some proteinaceous impurities. In such case, further processing of the solution would have to be resorted to in order to concentrate and further purify the desired activity. For example, solvent precipitation or salting out procedures as are well known to the art could be used.

The active precipitate is a mixture of the polymeric metaphosphate complexes of the active protein, together with the complexes of other undesirable proteinaceous materials; and although it is desirable to further purify this mixture, it can be used directly as an antigenic material when put into solution by adjustment of pH and diluted to useable titers.

The fractionation of the solid mixture of the metaphosphate protein complexes now proceeds along lines designed to remove the active group of the complexes from the others in the mixture, taking advantage of their different solubilities primarily with respect to pH and secondarily with respect to temperature, salt concentration, etc. These operations are merely a matter of expediency governed solely by the precipitation point of the desired complex relative to those of the co-precipitated materials.

One method of separation is to resolubilize all of the precipitated materials by returning to an alkaline pH and then by careful acidification, precipitating the different fractions one by one. Alternatively, the mixture may be treated with successive solutions of increasing pH effecting a separation by fractional solution. In either case, with a predetermined knowledge of the precise solubility limits of the desired active fraction, the process of selecting it from the mixture may be reduced to a limited number of simple essential steps.

The precise conditions required for the complete precipitation or solution of the desired active fraction can be easily predetermined by manipulation of a small aliquot portion of the broth using methods well known to the art to determine whether the activity has been precipitated or remains in solution at any particular point. For example, in the case of the toxoids, the Ramon flocculation test provides a convenient method for determining whether the active toxoid is present and to what extent.

In the case of the toxoids, I prefer to re-dissolve all of the precipitate and then fractionally re-precipitate the separate fractions. The solution of the metaphosphate complexes is accomplished by suspending the filter cake in a small volume of a non-toxic buffer solution sufficiently alkaline to dissolve all of the precipitated metaphosphate complexes. This will occur in the pH range of 5.5 to 9 with a pH of about 7.5 to 8 preferred. Any well-known non-toxic buffer that is not a protein precipitant within this range would be satisfactory. For example, phosphate, citrate-borate, and bicarbonate buffers are typical examples of useful ones. However, I prefer to use a 0.15 M $Na_2HPO_4$ solution. Any non-toxic alkali that is not a protein precipitant could be used in place of the buffer solution; but buffer is preferred since the use of free alkali would involve careful pH control.

The filter cake is stirred in the buffer solution for about 30 minutes at room temperature resulting in a fairly concentrated solution of the metaphosphate complex of the active principle, together with other proteinaceous materials. The solution is then acidified with a strong acid to the lowest pH at which substantially all of the activity remains in solution (just above the iso-electric pH of its metaphosphate complex), and at which the maximum amount of undesirable protein complexes have been precipitated (below the iso-electric pH's of these protein complexes). This pH can easily be predetermined on an aliquot portion of the solution using the Ramon flocculation test as an indication of the presence of antigenic activity. In the case of the toxoids, this pH is in the range of about 4.8 to 5.2 or preferably 5. At a pH of 5, most of the undesirable proteins have precipitated as their metaphosphate complexes while substantially all of the activity remains in solution. After filtering the solution and discarding the precipitate we have a solution containing substantially all of the activity in the form of its polymeric metaphosphate complex, usually pure to a level of about 1100–1400 $L_f$/mg. N or better. The solution may be neutralized at this point and considered a final product useful as an antigenic material when diluted to proper titers or useful for further processing into alum precipitated preparations.

Since in fluid toxoid normal dilution to useful titers will reduce the metaphosphate to negligible concentration and in alum precipitated preparations its concentration can be taken into account, it need not be removed from solution. However, if it is desired to remove the metaphosphate ions from the complex, it can be done at this point either by dialysis, precipitation as insoluble calcium or barium salts at an alkaline pH, or preferably by treatment of the solution at room temperature at neutral pH with an anion exchange resin in a salt cycle of which the anion is preferably one which it would not be objectionable to include in an injectable material. For example, Nalcite SAR was found suitable. This material is a strong base anion exchange resin in the chloride cycle available from the National Aluminate Corporation. Treatment with such an anion exchange resin will remove all metaphosphate from the solution without any loss of $L_f$ or increase in $K_f$ of the antigenic activity. As previously indicated, I have not found it necessary to remove the metaphosphate from solution.

Some residual porphyrins may be left in solution at this stage and it is preferred to remove them. Their removal together with increased purity of the desired protein solution (in the case of diphtheria and tetanus toxoids to an $L_f$/mg. N of about 1500) can be accomplished by treating the solution with activated carbon and then filtering the solution free from said carbon. The activated carbon treatment is preferably done after adjusting the pH of the solution with a strong alkali to about 8, preferably using an alkali that will not introduce toxic or otherwise undesirable cations into the solution. For preparation of a parenterally administered material I prefer to use NaOH.

We have now a relatively concentrated solution of active material substantially free from undesirable impurities. This solution may be of the desired active principle (e. g. the toxoid) or it may be of the polymeric metaphosphate complex of the active principle. Diluted to proper titers it may be directly used as an antigenic material or it may be further processed as is well known to the art, as for example, to form alum precipitated preparations.

In order that those skilled in the art may better understand how the present invention may be better carried into effect, the following examples are given by way of illustration:

EXAMPLE 1

Tetanus toxoid

To 1 liter of cold tetanus toxoid, prepared by the Mueller method, held at a pH of 8, having an $L_f$/ml. of 30 and a $K_f$ of 60 minutes, was added 2.55 grams of sodium hexametaphosphate dissolved in 50 ml. of water. The hexametaphosphate solution was dispersed uniformly and approximately 15 ml. of concentrated HCl was added drop-wise to a pH of 3.1 (glass electrode at 2°–5° C.). The solution was stirred for 20 minutes and 2.5 grams of diatomaceous filter-aid was added and the solution was stirred for another 10 minutes. A small portion of the above weight of filter-aid was suspended in a cold solution of .2 M NaCl adjusted to pH 3.1 and used to prepare a filter bed on a suction filter of Whatman No. 1 paper. The mixture was suction filtered. The precipitate was washed on the filter with cold saline solution adjusted to a pH of 3.1 until the effluent was colorless. The inactive filtrate and wash were discarded. At this stage, the precipitate has 96–100% of the original crude activity: 900–1100 $L_f$/mg. N, $K_f$ 30–40 minutes.

The washed precipitate plus filter-aid was suspended in 50 ml. of 0.15 M $Na_2HPO_4$ solution (yields final pH of 7.5) at room temperature and stirred approximately 30 minutes. The mixture was cooled and the pH carefully adjusted with HCl to exactly 5 and equilibrated with stirring approximately one hour. The mixture was suction-filtered and the filter cake washed in several stages with a total of 25 ml. of 0.15 M phosphate adjusted previously to pH 5. The final wash is colorless. The combined washes and filtrate are sparkling clear and light amber in color and contain 85–90% of the original activity: 1300–1400 $L_f$/mg. N, $K_f$ 18–25 minutes. The filter cake was discarded (containing inert proteins plus 8–15% of low grade activity): 100–300 $L_f$/mg. N, $K_f$ several hours.

The pH of the filtrate was adjusted to 8 with NaOH and stirred with activated charcoal of vegetable origin (Darco G–60) at 1 gram per 200,000 $L_f$ for 15 minutes. While stirring, ½% of filter-aid on a weight/volume basis was added and suction filtered through a thin bed of filter-aid. The carbon cake was washed with 0.15 M phosphate at pH 8 and the filtrate and washings combined. This pale yellow solution contains the final product in 78–85% overall yield: 1450–1700 $L_f$/mg. N, $K_f$ 12 to 18 minutes.

A small amount of this solution was re-constituted in physiologic saline with no ortho phosphate buffer added. The pH adjustment was effected with dilute NaOH and HCl. This sample gave no qualitative test for phosphorus (color test with ammonium molybdate reagent and benzidine as described by Feigl in "Spot Tests", 3rd ed., Elsevier Publishing Co., Inc., New York (1946); sensitivity one part per million). After heating, preferably with acid, a positive phosphorus test was obtained. After seven days storage of the metaphosphate toxoid solution in the cold, these test results were identical.

Animal tests show the above product to fully meet the minimum requirements for tetanus toxoid of the National Institutes of Health, 3rd revision, April 3, 1947.

EXAMPLE 2

Diphtheria toxoid

The procedure for the concentration and purification of diphtheria toxoid is essentially the same as that decribed above for tetanus toxoid with the modifications as described below.

One liter of cold diphtheria toxoid as prepared according to specifications set out by the Antitoxin and Vaccine Laboratory of the Department of Public Health of the Commonwealth of Massachusetts having a pH of 6.5 $L_f$/ml. 85, $K_f$ 15 minutes, was the starting material. Since this solution was more viscous than tetanus crude, it required a greater amount of filter-aid (3 grams) to secure an equivalent filtration rate. The acid precipitation (pH 3.1) contains a large amount of red porphyrin and yields 97–100% activity: 900–1200 $L_f$/mg. N, $K_f$ 14 minutes.

The precipitate at pH 5 which was discarded contained 10–12% of the original activity: 200–300 $L_f$/mg. N, $K_f$ greater than two hours. The solution containing 82–90% of the yield has 1100–1300 $L_f$/mg. N, $K_f$ 14–18 minutes. The activated carbon absorption was accomplished by the use of activated carbon at the rate of 1 gram per 350,000 $L_f$; the final pale yellow solution yielded 70–80% of the original activity: 1300–1600 $L_f$/mg. N, $K_f$ 12–16 minutes.

Animal tests show the above product to fully meet the minimum requirements for diphtheria toxoid of the National Institutes of Health, 4th revision, March 1, 1947.

The above examples are merely illustrative and are not intended to limit the scope of the invention previously described. It is clear from the above description that the method can easily be adjusted to meet the individual characteristics of a particular protein of bacterial origin.

I claim:

1. In a method of recovering a toxoid selected from the group consisting of tetanus and diphtheria toxoids in concentrated and purified form from a toxoid-containing broth, the steps comprising adding to said broth a soluble vitreous alkali-metal phosphate having an $M_2O/P_2O_5$ mole ratio lying between 1.0 and 1.66 where M signifies an alkali metal, lowering the pH of the broth to the pH of substantially complete precipitation of toxoid complex, separating from the mixture the precipitate containing the toxoid complex in admixture with undesirable protein complex molecules, equilibrating said precipitate with a non-toxic aqueous solution at the lowest pH of solubility of substantially all of said toxoid complex and separating the solution of the toxoid complex from the mixture.

2. In a method of recovering tetanus toxoid in concentrated and purified form from tetanus toxoid containing broth the steps comprising adding to said broth a soluble vitreous alkali-metal phosphate having an $M_2O/P_2O_5$ mole ratio lying between 1.0 and 1.66 where M signifies an alkali metal, adjusting the pH of the broth to about 3, separating the precipitate from the mixture, equilibrating said precipitate with a non-toxic aqueous solution at a pH in the range of 4.8 to 5.2 and separating the solution of the tetanus toxoid complex from the mixture.

3. In a method of recovering diphtheria toxoid in concentrated and purified form from diphtheria toxoid containing broth the steps comprising adding to said broth a soluble vitreous alkali-metal phosphate having an $M_2O/P_2O_5$ mole ratio lying between 1.0 and 1.66 where M signifies an alkali metal, adjusting the pH of the broth to about 3, separating the precipitate from the mixture, equilibrating said precipitate with a non-toxic aqueous solution at a pH in the range 4.8 to 5.2 and separating the solution of the diphtheria toxoid complex from the mixture.

4. In a method of recovering a toxoid selected from the group consisting of tetanus and diphtheria toxoids in concentrated and purified form from a toxoid-containing broth, the steps comprising adding to said broth a soluble vitreous alkali-metal phosphate having an $M_2O/P_2O_5$ mole ratio lying between 1.0 and 1.66 where M signifies an alkali metal, lowering the pH of the broth to the pH of substantially complete precipitation of toxoid complex, separating from the mixture the precipitate containing the toxoid complex in admixture with undesirable protein complex molecules, dissolving said precipitate in a non-toxic solution at the pH of solubility of all of said complexes, acidifying said solution to the lowest pH of solubility of substantially all of said toxoid complex and separating the solution of the toxoid complex from the mixture.

5. In a method of recovering tetanus toxoid in concentrated and purified form from tetanus toxoid containing broth the steps comprising adding to said broth a soluble vitreous alkali-metal phosphate having an $M_2O/P_2O_5$ mole ratio lying between 1.0 and 1.66 where M signifies an alkali metal, adjusting the pH of the broth to about 3, separating the precipitate from the mixture, dissolving said precipitate in a non-toxic aqueous buffer solution having a pH in the range of about 7.5 to 8, acidifying said solution to a pH in the range 4.8 to 5.2 and separating the solution of the tetanus toxoid complex from the mixture.

6. In a method of recovering diphtheria toxoid in concentrated and purified form from diphtheria toxoid containing broth the steps comprising adding to said broth a soluble vitreous alkali-metal phosphate having an $M_2O/P_2O_5$ mole ratio lying between 1.0 and 1.66 where M signifies an alkali metal, adjusting the pH of the broth to about 3, separating the precipitate from the mixture, dissolving said precipitate in a non-toxic aqueous buffer solution having a pH in the range of about 7.5 to 8, acidifying said solution to a pH in the range 4.8 to 5.2 and separating the solution of the diphtheria toxoid complex from the mixture.

References Cited in the file of this patent

UNITED STATES PATENTS 2,105,446     Wilson _____ Jan. 11, 1938

OTHER REFERENCES

Ericsson: Nature, vol. 158, No. 4010, Sept. 7, 1946, pp. 350 and 351.

Jacobs et al.: J. A. P. A. (Sci. Ed.) vol. 39, No. 8, August 1950, pages 466 to 468.

Jacobs et al.: J. A. P. A. (Sci. Ed.) vol. 40, No. 10, October 1951, pages 488 to 490.